(12) United States Patent
Tibout et al.

(10) Patent No.: US 9,846,238 B2
(45) Date of Patent: Dec. 19, 2017

(54) ENHANCED DELIVERY OF GNSS CORRECTION DATA THROUGH RESTRICTED NETWORKS

(71) Applicant: Raven Industries, Inc., Sioux Falls, SD (US)

(72) Inventors: Marc Roger Tibout, L'Ile-Bizard (CA); Clinton Howard Mundt, Cedar Park, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 767 days.

(21) Appl. No.: 13/793,055

(22) Filed: Mar. 11, 2013

(65) Prior Publication Data

US 2014/0253374 A1    Sep. 11, 2014

(51) Int. Cl.
*G01S 19/07*   (2010.01)
*G01S 19/04*   (2010.01)

(52) U.S. Cl.
CPC ................... *G01S 19/04* (2013.01)

(58) Field of Classification Search
CPC ....................................................... G01S 19/04
USPC .................................................... 342/357.44
See application file for complete search history.

(56) References Cited

U.S. PATENT DOCUMENTS

| | | | | |
|---|---|---|---|---|
| 5,490,252 A | * | 2/1996 | Macera | H04L 12/5692 370/402 |
| 5,510,798 A | * | 4/1996 | Bauer | G01S 19/07 342/357.31 |
| 5,884,220 A | * | 3/1999 | Farmer | G01S 19/41 342/357.44 |
| 5,903,559 A | * | 5/1999 | Acharya | H04L 12/4608 370/254 |
| 6,323,803 B1 | * | 11/2001 | Jolley | G01S 5/009 342/357.42 |
| 7,292,867 B2 | * | 11/2007 | Werner | H01Q 1/273 342/357.31 |

(Continued)

OTHER PUBLICATIONS

Birdwell, "NTRIP/CORS: How it works and what is involved?", Aug. 15, 2012, http://www.agleader.com/blog/ntrip-cors-how-it-works-and-what-is-involved/.*

(Continued)

*Primary Examiner* — Frank J McGue
(74) *Attorney, Agent, or Firm* — Schwegman Lundberg & Woessner, P.A.

(57) ABSTRACT

Disclosed in some examples are methods, systems and machine readable mediums to efficiently stream data across restricted networks. In some examples, this streamed data may be sent more efficiently using lower overhead protocols such as UDP. In order to bypass the aforementioned limitations on these lower overhead protocols, the client may send a periodic update message to the server. This update message maintains the openings in the network firewalls and updates the server on the client's status. This update message may be sent much less frequently than a typical TCP acknowledgement, and the lower overhead protocol may be a protocol that does not retransmit lost or corrupted packets—thereby eliminating unnecessary overhead. In some examples this streamed data may be GNSS correction data. In some examples, the client may be behind one or more network firewalls.

18 Claims, 6 Drawing Sheets

(56) References Cited

U.S. PATENT DOCUMENTS

| | | | |
|---|---|---|---|
| 2002/0010758 A1* | 1/2002 | Chan | G06F 17/3087 709/218 |
| 2007/0157303 A1 | 7/2007 | Pankratov | |
| 2008/0018527 A1* | 1/2008 | LaMance | G01S 19/05 342/357.66 |
| 2009/0201196 A1* | 8/2009 | Abraham | B64G 1/1014 342/357.43 |
| 2009/0240824 A1 | 9/2009 | Rekhtman | |
| 2010/0322214 A1* | 12/2010 | Workman | H04W 4/02 370/338 |
| 2012/0284385 A1 | 11/2012 | Kavanaugh et al. | |
| 2015/0153455 A1* | 6/2015 | Abraham | B64G 1/1014 342/357.42 |

OTHER PUBLICATIONS

Teejet Technolgies, "NTRIP RTK Delivered via CORS/Network RTK", @2011, http://teejet.it/media/422397/98-01410%20r0%20en-us%20tech%20update%20ntrip%20rx610.pdf.*

Nicolas J. Tucker, "Network-RTK Testing & SydNet" University of New South Wales, Sydney, Austrailia, 2015.*

Ocalan et al., "Data Communiation for Real-time Positioning and Navigation in Global Navigation Satellite Systems (GNSS)/Continuously Operating Reference Stations (CORS) Networks", Scientific Research and Essays, vol. 5(18); pp. 2630-2639, Sep. 18, 2010.*

Gebhard et al., "Using the Internet for streaming differential GNSS data to mobile devices", 2005.*

"UDP hole punching—Wikipedia, the free encyclopedia", [Online]. Retrieved from the Internet: <URL: http://en.wikipedia.org/wiki/UDP_hole_punching>, (Accessed Mar. 1, 2013), 3 pgs.

"UDP Relay Version 0.9.1 Natural Resource Canada: Geodetic Survey Divison", (Sep. 5, 2003), 40 pgs.

Ford, Bryan, "Peer-to-Peer Communication Across Network Address Translators", [Online]. Retrieved from the Internet: <URL: http://www.brynosaurus.com/pub/net/p2pnat/>, (Feb. 17, 2005), 17 pgs.

Kurt, "Raven Buys Cellular RTK Precision FArming Technology", [Online]. Retrieved from the Internet: <URL: http://precisionpays.com/2009/10/raven-buys-cellular-rtk-precision-farming-technology/>, (Posted on Oct. 28, 2009), 1 pg.

Schmidt, Jurgen, "The Hole Trick: How Skype & Co. get round firewalls", [Online]. Retrieved from the Internet: <URL: http://www.h-online.com/security/features/How-Skype-Co-get-round-firewalls-747197.html>, (Dec. 15, 2006), 3 pgs.

Strautman, Bill, "Upgrade Your Guidance with RTK", The adAdvance, Issue 003, (Nov./Dec. 2009), 34-37.

Wei, Yuan, et al., "A New Method for Symmetric NAT Traversal in UDP and TCP", Network Research Workshop 2008, [Online]. Retrieved from the Internet: <URL: http://www.goto.info.waseda.ac.jp/~wei/file/wei-apan-v10.pdf>, (Aug. 4, 2008), 8 pgs.

"Networked Transport of RTCM via Internet Protocol (Version 1.0)", (c) 2003 Dirk Stoecker, (2003), 22 pgs.

* cited by examiner

ENHANCED DELIVERY OF GNSS CORRECTION DATA THROUGH RESTRICTED NETWORKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven, Industries, All Rights Reserved.

BACKGROUND

Global Navigation Satellite Systems (GNSS) allow devices to calculate their geospatial position based upon signals sent from GNSS satellites. Example GNSS' include the Global Positioning System (GPS), Globalnaya Navigatsionnaya Sputnikovaya Sistema (GLONASS), and Galileo. While the accuracy of a position calculated from a typical GNSS system is adequate for some tasks, greater accuracy is required for things like precision navigation applications such as machine guidance systems. Various techniques have been developed which utilize correction information to assist GNSS receiver devices to increase the accuracy of their positional calculations. One such example is Real Time Kinematics (RTK). In RTK systems, a device whose position is to be accurately determined (often called a "rover"), will utilize GNSS correction information sent from a nearby GNSS correction generation device (e.g., an RTK correction generation device—sometimes called an RTK "base station" or an RTK "reference station") to correct the geospatial location calculated from the GNSS system.

In some cases, the GNSS correction generation device is an on-site, or nearby device which wirelessly transmits the GNSS correction information directly to the rover. These on-site GNSS correction generation devices are typically expensive and must be setup prior to use. Furthermore, a rover must stay within range of the wireless transmission which makes it unsuitable for precision navigation over longer distances.

In order to make GNSS correction information more accessible and easier to use, various entities have setup networks of GNSS correction generation devices. These networks feature numerous GNSS correction generation devices that transmit their corrections to a central server (generally over the Internet). The central server then provides the GNSS correction information over the Internet to anyone subscribed. Rovers may then contact the central server over the Internet to receive the GNSS correction information. Typically a rover utilizes a cellular network to connect to the central server over the Internet.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

One such example GNSS network is a Continuously Operating Reference Station (CORS) network which is managed by the National Geodetic Survey (NGS). The CORS network consists of a network of RTK base stations which provide RTK rovers with correction data over the internet using the Ntrip protocol (Networked Transport of Radio Technical Commission for Maritime Services via Internet Protocol).

Figure 1:
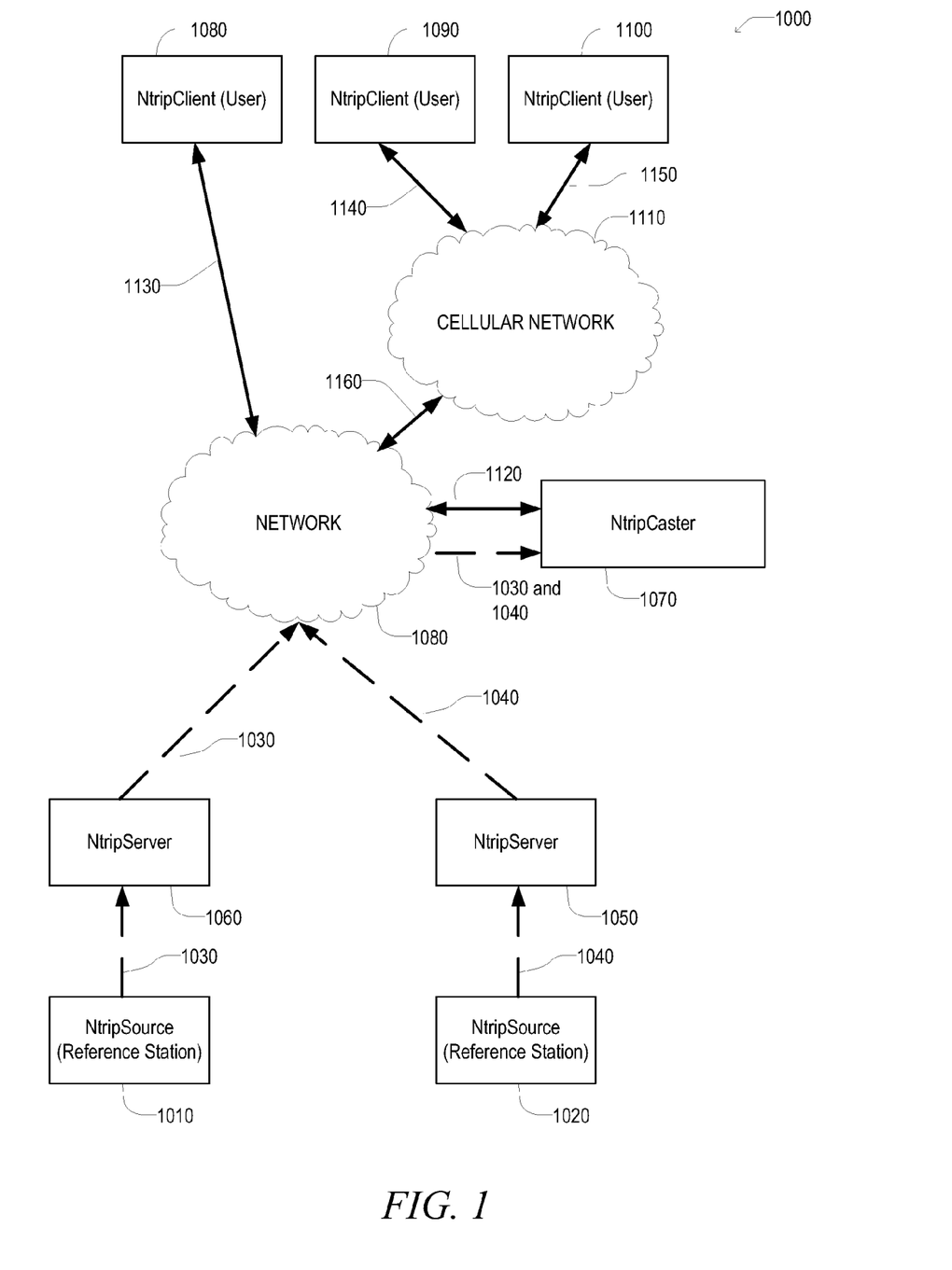
FIG. 1 shows a schematic of a CORS network according to some examples of the present disclosure

FIG. 1 shows an example CORS network 1000. NtripSources 1010 and 1020 (e.g., RTK base stations) generate correction data 1030, and 1040. NtripServers 1050, 1060 (which may be part of NtripSources 1010 and 1020) transfer the data 1030, 1040 from the sources to the NtripCaster 1070 over network 1080. Network 1080 can be or include portions of the Internet, a cellular network, a local area network (LAN), a wide area network (WAN) or the like. The NtripCaster 1070 may be a web-accessible (HyperText Transfer Protocol—HTTP) server which receives the RTCM correction data from the NtripServers 1050, 1060. The NtripCaster 1070 provides this data to one or more NtripClients 1080, 1090, and 1100 through network 1080. Some NtripClients, such as NtripClients 1090 and 1100 may connect to the Internet through portions of a cellular network 1110. NtripClients wishing to receive the correction will typically connect (using Transport Control Protocol (TCP)) to the NtripCaster and register for one or more correction sources (e.g., 1030, 1040, or both). Registration typically involves authenticating (e.g., username and password) and negotiating the type of correction and other parameters (e.g., Quality of Service parameters, or the like). Once the NtripClient is registered, corrections (such as 1030 and 1040) may then be forwarded by the NtripCaster to the NtripClients. In FIG. 1, communication paths 1120-1160 show communication paths between the NtripClients 1080-1100 and the NtripCaster 1070. These communication paths may be multicast, broadcast, or point-to-point.

Ntrip was originally conceived as a tool to deliver correction data over the Internet and works best using a wired connection to the Internet. However, today's usage differs dramatically in that many NtripClients connect to the Internet using a cellular network. This is especially true in agriculture where automated farming is becoming more popular. The use of the Ntrip protocol with a cellular-based connection to the Internet introduces problems.

For example, the Ntrip protocol requires the NtripClient to first authenticate with the NtripCaster using a username and password and then request a specific correction type (RTCM or CMR+) from a specific reference station. In some situations, where a reference station is networked with other adjacent reference stations to create a correction utilizing a virtual base station, additional information such as the client's current position (latitude and longitude) must also be communicated to the NtripCaster. In most instances, this position information must be relayed to the NtripCaster as frequently as several times per minute. The result is a heavy dependency on the cellular connection to reliably and effectively deliver this information on a consistent basis. In rural areas where cellular availability is not always dependable, the ability to retain a cellular connection and deliver this information in a timely manner is a real and concerning challenge. Whenever cellular connectivity with the NtripCaster is severed, the client must re-authenticate and request re-connection to the reference station and re-identify the requested correction format. This is somewhat redundant, time consuming, and can have a compounding effect on the amount of time a user is without any RTK corrections.

An additional problem with Ntrip is that connections between NtripClients and NtripCasters utilize TCP (Transport Control Protocol). TCP is inefficient in the context of streaming time sensitive data (such as GNSS correction streaming) as it introduces overhead in the form of bi-directional exchanges for all corrections. Typically correction data is very time critical and as such retransmitted correction data may not even be usable by the time it is received. Given the relatively scarce bandwidth available and the lower data rates on cellular networks, this is undesirable as it wastes bandwidth and may impose additional cost as some cellular plans charge based on data usage (e.g., the client pays for the overhead).

Streaming data using connectionless transport mechanisms with less overhead, such as User Datagram Protocol (UDP), present challenges in the context of restricted networks (such as cellular networks). In particular, many restricted networks (e.g., cellular networks) employ firewalls on their gateway routers that block incoming network traffic addressed to an internal device (e.g., a mobile user) unless the traffic is considered to be a reply to traffic first initiated from the internal device. In particular, the gateways will note a packet sent from a source device in their network to an external address. The gateway will allow communications sent from the external address to the source internal device for a brief period of time (typically around 30 seconds) after the outbound packet was logged to allow the source internal device to receive the reply from the external device. For TCP connections, this is less of a problem as TCP connections are constantly generating traffic from the internal device to the external device in the form of acknowledgement messages and other control overhead and so the firewalls remain open to incoming streaming data. For a lower overhead protocol such as UDP, the streaming data is not acknowledged and so packets primarily flow from the external source (e.g., the NtripCaster) to the internal device (e.g., the NtripClient) without a significant amount of return traffic (if any). Thus it is possible that the cellular network's firewalls may close, cutting off the streaming data. Some of the network firewalls or gateways used in the communication paths between client and server may also implement Network Address Translation (NAT), preventing a direct use of a client's IP address and port number. Each of such involved firewalls or gateways will internally record routes and maintain paths open for a certain amount of time to allow return traffic.

In addition to the firewall issue, another issue with using a transport mechanism such as UDP is that there is no way of knowing if the client (the recipient of the streaming data) is still alive and still at the same IP address. The server (the device sending the streaming data to the client) could be sending streaming packets to a client that is shut-off, or has switched IP addresses (which is possible given that it may be a mobile device). This wastes bandwidth on the cellular network 1110, network 1080 and resources on the server 1070.

Disclosed in some examples are methods, systems and machine readable mediums to efficiently stream data across restricted networks. In some examples, this streamed data may be sent more efficiently using lower overhead transport mechanisms such as UDP. In order to bypass the aforementioned limitations on these lower overhead transport mechanisms, the client may send a periodic update message to the server. This update message maintains the opening in the network firewalls and updates the server on the client's status. This update message may be sent much less frequently than a typical TCP acknowledgement, and the lower overhead protocol may be a protocol that does not retransmit lost or corrupted packets—thereby eliminating unnecessary overhead. In some examples this streamed data may be GNSS correction data. In some examples, the client may be behind a cellular network firewall.

Also disclosed in some examples is an intermediate server which may be utilized to allow streaming of data between conventional sources (e.g., conventional NtripCasters) and clients which wish to utilize the more efficient streaming methods disclosed herein. This allows for implementation of the techniques disclosed herein without modification to the conventional sources (and importantly, in some examples, without modification to the Ntrip protocol). The intermediate server may act as a TCP endpoint for the streamed data from the source, and a UDP (or some other lower overhead protocol) endpoint for the clients. Thus the intermediate server may maintain the TCP connection using a reliable Internet connection with the source and forwards correction packets received over that TCP connection from the streaming source over the lower overhead protocol to the client. The intermediate server may receive and process the periodic update messages from the client to maintain the path through the firewall and to update the status of the client in a data store (e.g., a database or other data storage) of the intermediate server. The intermediate server may also handle authentication on behalf of the client. This has the added benefit that if the client's connection momentarily drops, it can quickly re-establish the stream as it will not have to re-authenticate with the streaming source (as the intermediate server will maintain the connection). This provides for increased reliability in cases where the network conditions are less than ideal for the client.

A lower overhead transport mechanism may be any transport layer mechanism (as defined in the Open Systems Interconnect (OSI) network model) that provides transport layer services including end-to-end communications services, but does not require acknowledgments and retransmissions. An example may include User Datagram Protocol (UDP).

Figure 2:
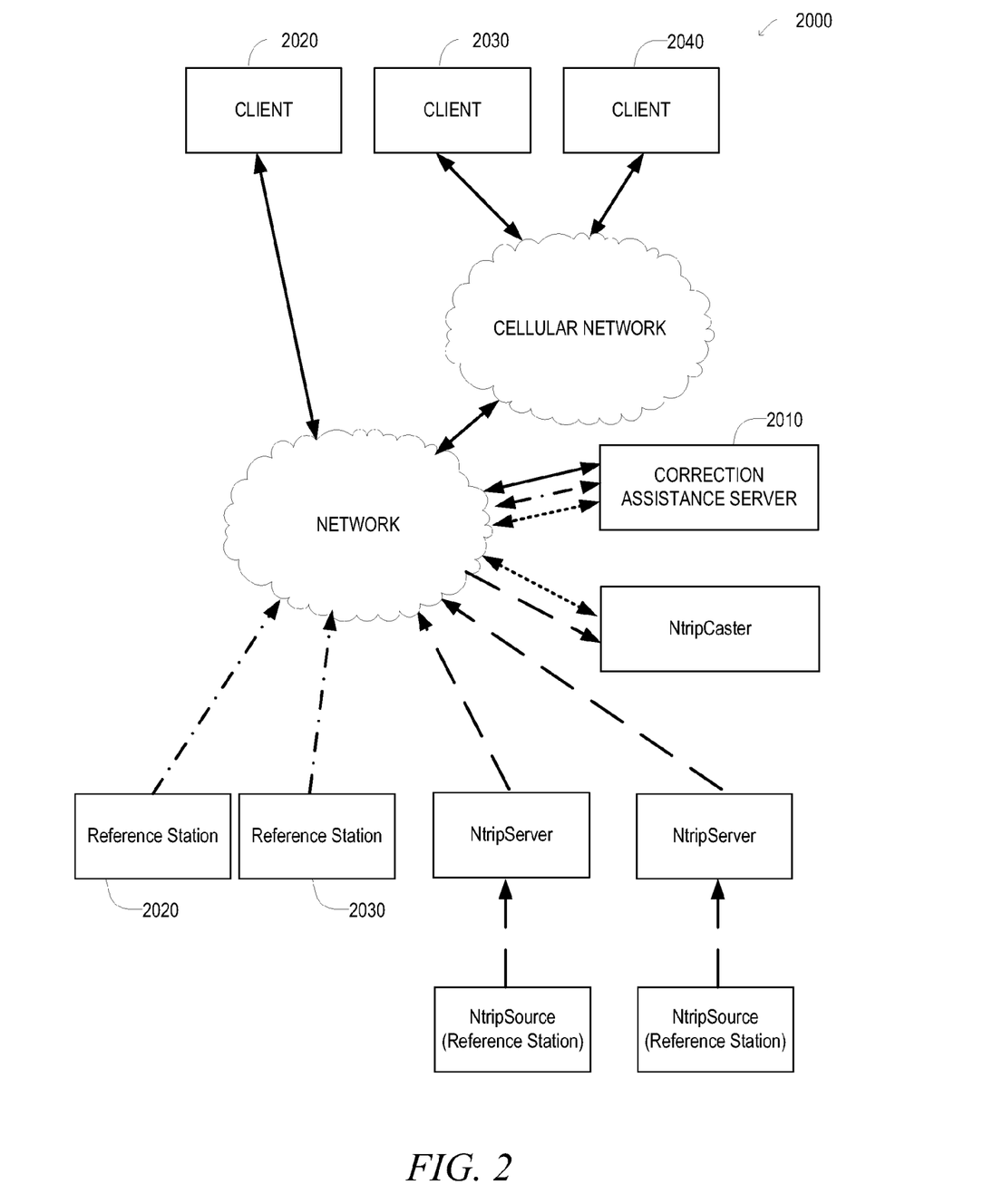
FIG. 2 shows a schematic of a modified CORS network according to some examples of the present disclosure.

FIG. 2 shows one example system using an intermediate server in the form of a correction assistance server 2010. For example, the correction assistance server may contain a data store (e.g., database) including information on each client (e.g., clients 2020, 2030, and 2040) registered with the correction assistance server. This information may include a client identification number which may uniquely identify a client to the correction assistance server, authentication information for the streaming source (e.g., NtripCaster) associated with the client, a last known Internet Protocol Address where the client may be reached, a status of the client, a location of the client, and the like.

The clients may send a message to the correction assistance server to begin receiving correction data. This message may contain the client identification number. In parallel or within the same message, the clients may send a current rough position of the client to either the correction assistance server, or to one or more of the correction sources (e.g., a rover). The correction assistance server may then look up authentication (e.g., username and password) and correction information (e.g., the type of correction data requested) for that client in a database and use that information to register at the streaming source (e.g., NtripCaster) for streamed correction data on behalf of the client. The correction assistance server 2010 may direct the streaming source to send the correction data to the correction assistance server 2010 instead of the client. The correction assistance server may update a status of the client in its data store to indicate that the client has requested particular streamed correction data and that the connection with the streaming source has been setup. Additionally the correction assistance server may store the IP address associated with the client.

Correction data is then streamed from the streaming source to the correction assistance server 2010 who then forwards that correction data to the clients. In order to allow for continued streaming of correction data back through the cellular network, the client may send periodic update messages to the correction assistance server. These update messages may be sent using the low overhead protocol and may contain the unique identifier of the client. Upon receiving an update message, the correction assistance server may look up the records of the client using the unique identifier and update the destination IP address of the client in those records. This ensures that if the cellular network assigns the client a new IP address that the correction data will still reach the client.

In other examples, correction data may also be streamed directly from reference stations (e.g., reference stations 2020-2030) using a connectionless low-overhead protocol which does not require an NtripServer or an NtripCaster (e.g., they operate independently of an Ntrip protocol). In this case, the reference station may create streams of correction data sent directly to the correction assistance server 2010.

This system significantly reduces dependencies on the potentially inconsistent and unreliable cellular connection. As a result, when the cellular connection is compromised, authentication and configuration with the client remains intact. Once cellular connectivity is reestablished, the resumed transmission of correction data is virtually instantaneous.

The end result is a more frequent, consistent and reliable method of ensuring correction data is moved from the correction source to the client. While the disclosure herein utilizes a correction assistance server that is separate from the correction server (e.g., the NtripCaster or a reference station), one of ordinary skill in the art with the benefit of Applicants' disclosure will appreciate that the Ntrip protocol could be modified to support similar functionality, or that the functions of the correction assistance server may be supported by the NtripCaster. In yet other examples, one of ordinary skill in the art with the benefit of Applicants' disclosure will appreciate that the correction assistance server could play the role of NtripCaster by collecting correction streams sent by NtripServers. Additionally, while the specification describes GNSS correction data such as RTK data as the streamed data, one of ordinary skill in the art will appreciate that any data streaming application may utilize the techniques described herein. For example, video, audio, audio/video, Voice over IP (VoIP), or the like. Additionally, the term firewall may be a software or hardware based network security device that controls incoming and outgoing network traffic by applying a set of rules to the traffic.

As used herein, the term client refers to a computer device which utilizes the streamed data and constitutes an end destination of the streamed data. The term server may refer to a computer device which sends the streamed data to the client device. The term stream source may refer to one or more computer devices which provide the server with the streamed data to send to the client. The stream source may be the same computer device as the server, or may be another device accessible to the server over a network. In the context of the CORS network of FIG. 1, the stream source may include the NtripSources 1010-1020 and the NtripServers 1050-1060. The server may include the NtripCaster 1070. In the context of the modified CORS network of FIG. 2, the correction assistance server 2010 may be the server, and the NtripCaster may be considered part of the stream source (along with the NtripSources and NtripServers). Thus what constitutes the server and what constitutes the source is determined with respect to which component is directly providing the client with the data. The stream source may be any component supplying the streaming data to the server.

Figure 3:
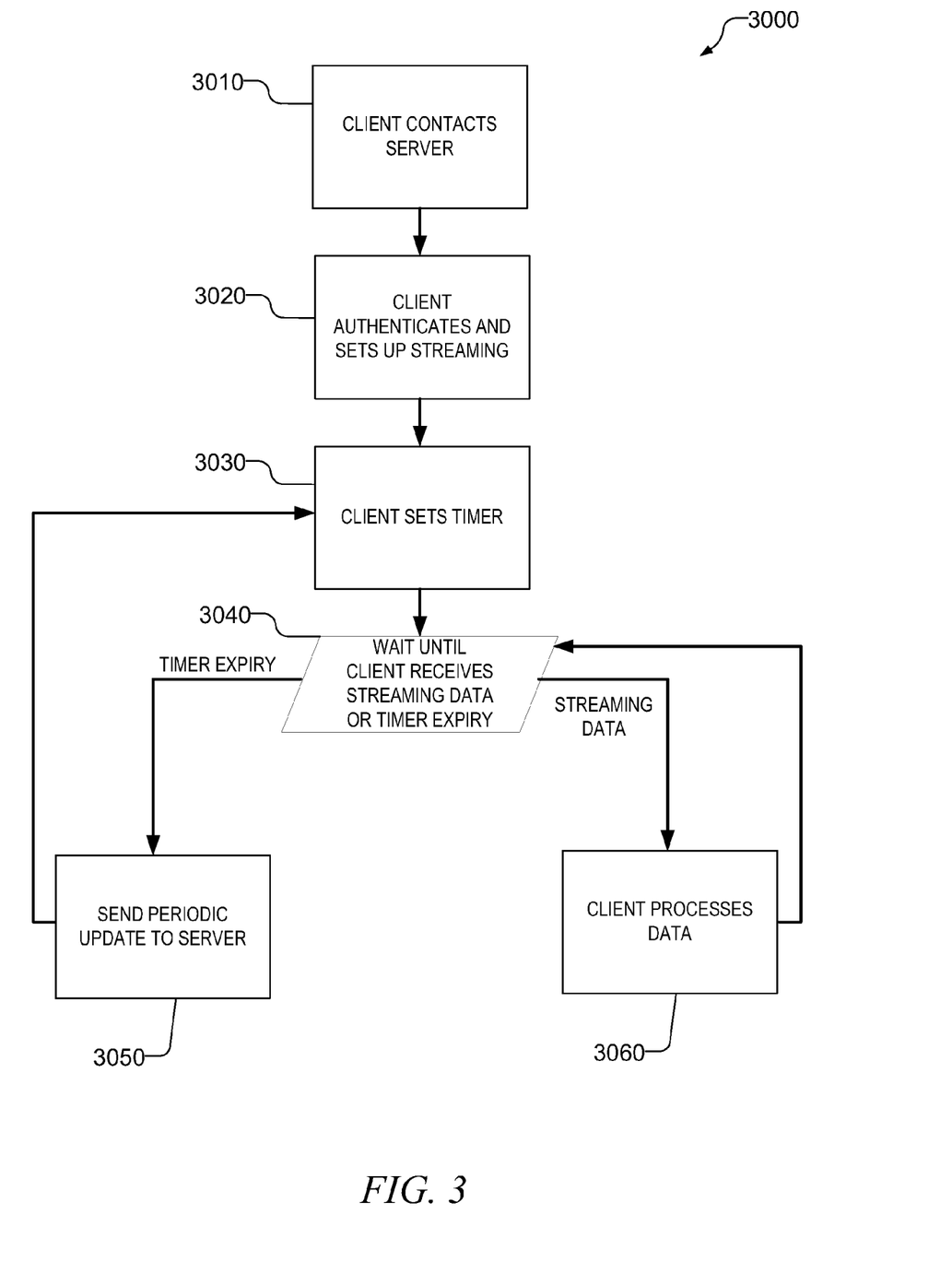
FIG. 3 shows a flowchart of a method according to some examples of the present disclosure.

Turning now to FIG. 3, a method 3000 of efficiently streaming data to a client is shown. At operation 3010 the client device that is interested in receiving the stream may contact the server providing the stream. In some examples this server may be a streaming source (e.g., an NtripCaster), or an intermediate server (e.g., a correction assistance server). The client may communicate with the server using one or more lower overhead transport mechanisms such as UDP. At operation 3020 the client may exchange information with the server to setup the stream. For example the client may need to provide some form of identification (e.g., a device identification) or some form of credentials (e.g., a username and password) to authenticate with the server. The client may also need to specify the particular stream it is interested in, negotiate the quality of service (QoS), relay a rough position of the client (for selecting the proper correction stream), or otherwise exchange information to setup the stream. For example, in the case of correction streams, the client may need to send its current location to the server to select a nearby correction source.

At operation 3030 the client device may set a timer. Upon expiry of the timer 3040, the client device may send the periodic update message to the server at operation 3050. In some examples, the periodic update message may contain the client's unique identification. This message serves to keep the firewalls open for the streaming data being sent back and to update the server on the client's status. The unique id may be assigned during operations 3010-3020, be a predetermined id (e.g., a Medium Access Control Address), or the id may have been previously assigned. The update message may also update the server on a change in IP address experienced by the client. For example, the client's network may have reassigned the IP address of the client and thus the client may no longer receive packets at that address. In addition, the server may need to know (or may provide to the streaming source) the location of the client. For example, certain GNSS correction sources require the client's rough position. Thus the update messages may relay this rough positioning. This allows the server to properly update its records regarding the client. Upon receiving streaming data at operation 3040, the client may process the streaming data at operation 3060. For example, if the streaming data is GNSS correction data, the client may utilize the correction data to determine or refine its position.

Figure 4:
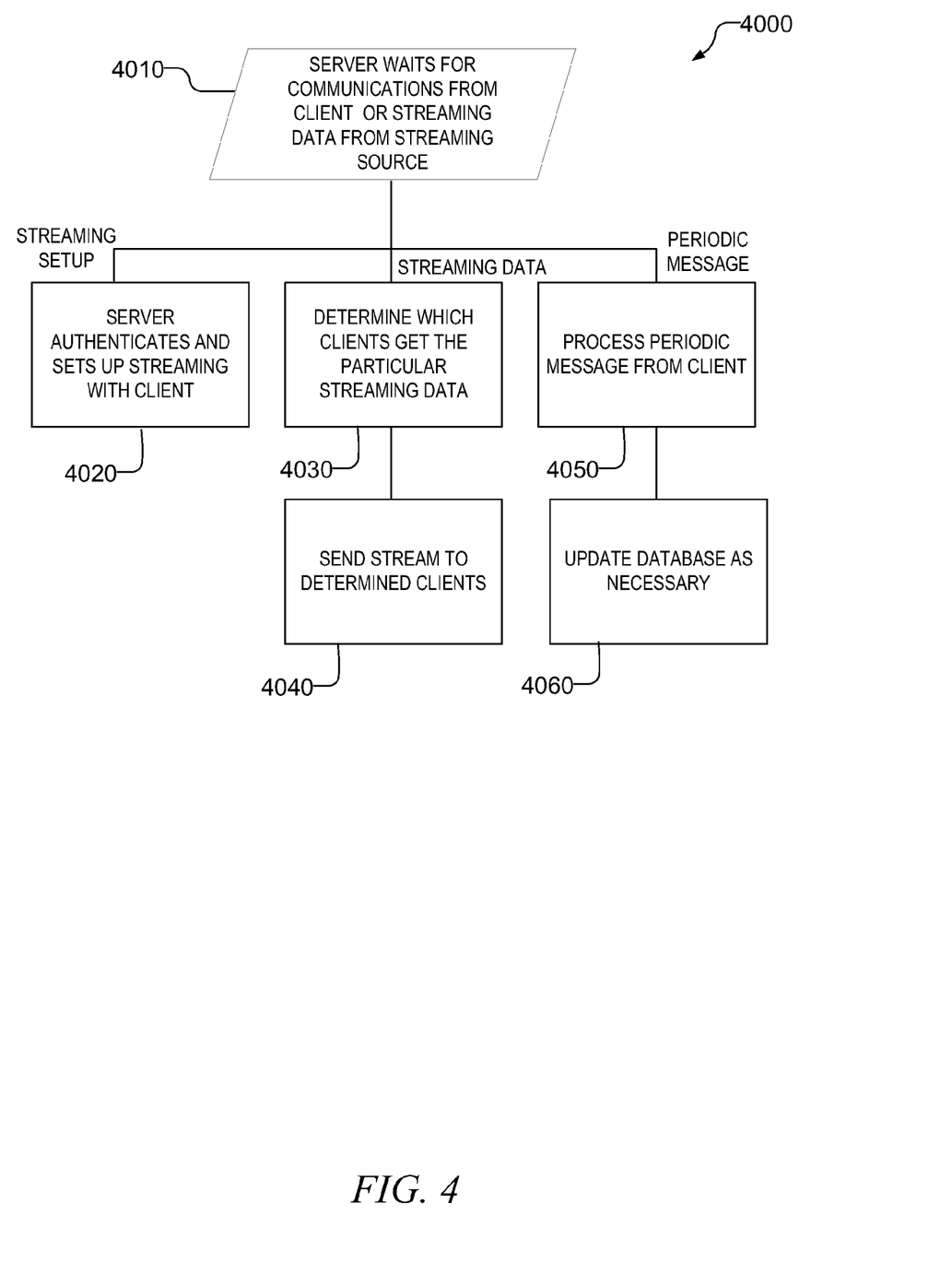
FIG. 4 shows a flowchart of a method according to some examples of the present disclosure.

Turning now to FIG. 4, an example method of providing efficient streaming to a client is shown. At operation 4010 the server waits for communications from clients or for streaming data to become available from a streaming source. A streaming source may be any source of streaming data such as a process generating GNSS correction data or data from another server (e.g., an NtripCaster), or the like. At operation 4020, if the server receives a message from a client seeking to receive a stream, the server may verify or authenticate the client, and setup and negotiate the stream. In some examples the setup may contain the client's unique identification. If the server is not the streaming source, e.g., the server is an intermediate server (such as a correction assistance server) the server may authenticate and setup streaming from a streaming source (e.g., an NtripCaster) on behalf of the client. The server would setup the corrections to be streamed first to the server, and then the server would forward the stream to the client. At operation 4030 if the server has streaming data available for transmission to clients (e.g., as a result of receiving GNSS correction data from an NtripCaster or other source), the server may determine which clients receive the streaming data. For example, the server may be handling different streams and may consult a data store to determine which clients receive which streams. Once the particular clients are determined, the server may send the stream to the determined clients at 4040 using the socket stored for each client in the server's data store. When the server receives a periodic message from the client at 4050 on that socket, then the server may update its data store regarding the client at 4060. For example, the server may utilize the unique id in the update message to look up the client's records in the server's data store. The server may then update its records regarding the client. Example updates may include updating an IP address or port number of the client, updating a timestamp of a last received message from the client (the server may stop sending streaming data without periodic update messages), updating the client's location, and the like.

In some examples, if the server does not get an update message from the client within a first predetermined time period, the server may stop forwarding streaming data to the client. If the client that timed out was the last client to receive a particular stream, the server may inform the stream source (e.g., an NtripCaster) to stop providing that particular stream. In some examples, the server may wait a second predetermined amount of time before ceasing to provide the stream. Thus once the first predetermined period of time elapses without the periodic update, the server may still receive streaming data, but will not forward it on to the client. Once the second predetermined period of time elapses, the server may stop the stream from the stream source. A periodic message from the client received after the first predetermined period has elapsed but before the second predetermined period elapsed may trigger the server to restart forwarding the data stream. A periodic message after the second period has elapsed may require the re-establishment of the stream.

Figure 5:
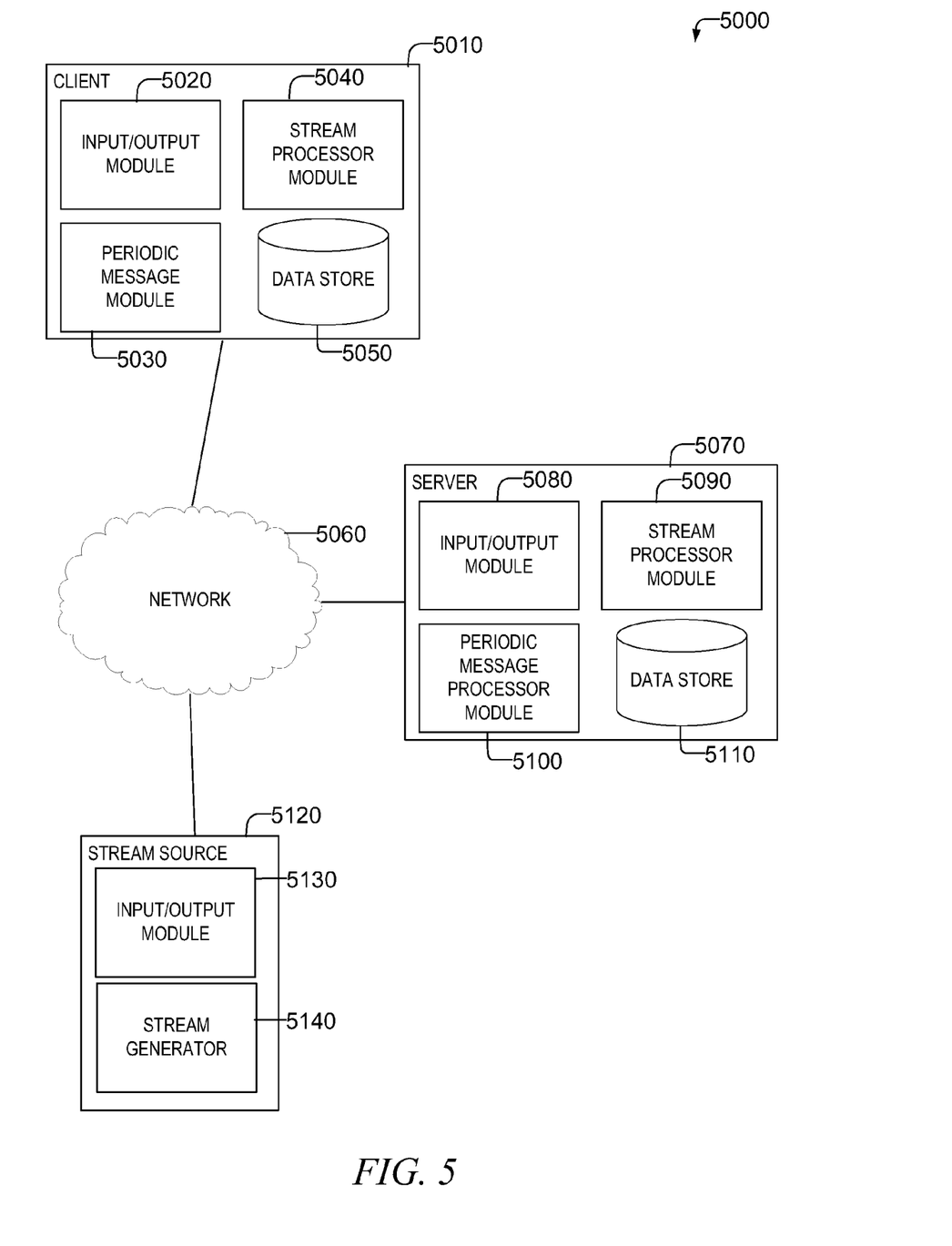
FIG. 5 shows a schematic of a system according to some examples of the present disclosure.

Turning now to FIG. 5 a schematic of a system 5000 according to some examples of the present disclosure is shown. Client 5010 receives streaming data from server 5070 which may receive the streaming data from a stream source 5120. Stream source 5120 as shown in FIG. 5 is another server (e.g., an NtripCaster). Stream source 5120 may generate the stream or may get its streaming data from another source as well (e.g., NtripServers). In yet other examples, the stream source 5120 may be part of server 5070.

Client 5010 may have an input/output module 5020 which may communicate over network 5060 to server 5070, stream source 5120, or both. In some examples, input/output module 5020 may request streaming data from server 5070. In some examples, input/output module 5020 may authenticate with server 5070. Input/Output module 5020 may communicate with input/output module 5080 on server 5070. Periodic message module 5030 may generate periodic messages to send to server 5070 using input/output module 5020. Input/output module 5020 may also receive streamed data from server 5070. The streamed data may be processed by stream processor module 5040. In some examples the streamed data may be GNSS correction data and the stream processor module 5040 may process this correction data. Data store 5050 may be used to store information on the streams requested, information on the server 5070, stream source 5120, or the like. In some examples, data store 5050 may store an identification that is unique to client 5010 with respect to server 5070.

Server 5070 may communicate with client 5010 and stream source 5120 across network 5060 using input/output module 5080. This communication may include authentication and setup of stream delivery on behalf of one or more clients 5010, streamed data reception from stream source 5120, stream data delivery to one or more clients 5010, periodic message receipt from client 5010, authentication with stream source 5120 on behalf of one or more clients 5010, and the like. Input/Output module 5080 may support TCP, UDP, or other connections. In some examples, input/output module 5080 may maintain TCP connections with stream source 5120 to receive streaming data and may utilize UDP connections with client 5010 to forward this data. Periodic message processor 5100 may process the periodic messages from one or more clients 5010. For example, the periodic message processor may identify the client based on a unique identifier included in the periodic message, and based on information in the message, update an IP address and path in data store 5110 associated with the client. In other examples, periodic message processor 5100 may update a field in data store 5110 indicating a timestamp that a periodic message was received. Stream processor module 5090 may receive streaming data from stream source 5120 through input/output module 5080 and may determine, based on data in the data store 5110, one or more clients 5010 that are registered to receive this streaming data. The stream processor module 5090 may then forward the received streaming data to the one or more identified clients 5010 using input/output module 5080. Stream processor module 5090 may also authenticate clients, and authenticate and setup streams on behalf of one or more clients 5010 in response to requests from clients.

Stream source 5120 may be a separate computing device and may be accessible over network 5060, or may be integrated with server 5070. Stream source may have its own input/output module 5130 to communicate with client 5010 and server 5070. Input/Output module may authenticate requests for streaming data (e.g., sent by the server on behalf of the client) and may send streaming data to server 5070 or client 5010. Stream generator 5140 may generate one or more streams of data. These streams in one example may include GNSS correction data.

Modules, Components and Logic

Certain embodiments are described herein as including logic or a number of components, modules, or mechanisms.

Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).
Electronic Apparatus and System Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
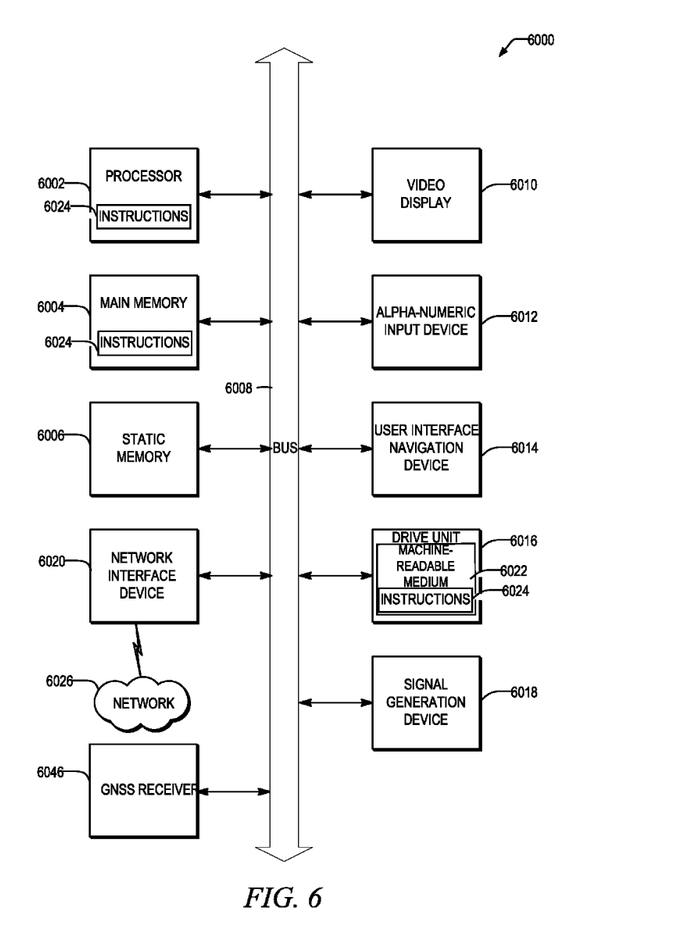
FIG. 6 shows a schematic of a machine according to some examples of the present disclosure.

FIG. 6 is a block diagram of machine in the example form of a computer system 6000 within which instructions, for causing the machine to perform any one or more of the methodologies discussed herein, may be executed. For example, any one of the components shown in FIG. 1-2, or 5 may be or contain one or more of the components described in FIG. 6. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 6 or only a subset of the components shown in FIG. 6.

The example computer system 6000 includes a processor 6002 (e.g., a central processing unit (CPU), a graphics processing unit (GPU) or both), a main memory 6004 and a static memory 6006, which communicate with each other via a bus 6008. The computer system 6000 may further include a video display unit 6010 (e.g., a liquid crystal display (LCD) or a cathode ray tube (CRT)). The computer system 6000 also includes an alphanumeric input device 6012 (e.g., a keyboard), a user interface (UI) navigation device 6014 (e.g., a mouse), a disk drive unit 6016, a signal generation device 6018 (e.g., a speaker) and a network interface device 6020.

Machine-Readable Medium

The disk drive unit 6016 includes a machine-readable medium 6022 on which is stored one or more sets of instructions and data structures (e.g., software) 6024 embodying or used by any one or more of the methodologies or functions described herein. The instructions 6024 may also reside, completely or at least partially, within the main memory 6004, static memory 6006, and/or within the processor 6002 during execution thereof by the computer system 6000, the main memory 6004 and the processor 6002 also constituting machine-readable media.

While the machine-readable medium 6022 is shown in an example embodiment to be a single medium, the term "machine-readable medium" may include a single medium or multiple media (e.g., a centralized or distributed data store, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 6024 may further be transmitted or received over a communications network 6026 using a transmission medium. The instructions 6024 may be transmitted using the network interface device 6020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 6020 may wirelessly transmit data and may include an antenna.

Global Navigation Satellite System (GNSS) receiver 6046 may receive signals from GNSS satellites which may be used to calculate the position of the GNSS receiver 6046. The GNSS receiver 6046 may contain all the logic necessary to receive, demodulate, and decode the GNSS signals as well as compute a position utilizing those signals.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER EXAMPLES

Example 1

A method of sending GNSS correction data to an agricultural implement, the method comprising using one or more computer processors to perform the operations of: receiving a request over a network from the agricultural implement for the GNSS correction data, the agricultural implement located behind a firewall; retrieving authentication information for the agricultural implement in a data store; authenticating with a Global Navigation Satellite System (GNSS) correction source using the authentication information; requesting from the GNSS correction source the GNSS correction data; receiving a periodic message from the agricultural implement; responsive to receiving the periodic message from the agricultural implement, updating an Internet protocol (IP) address associated with the client device; receiving the GNSS correction data from the GNSS correction streaming source; and responsive to receiving the correction data, forwarding the GNSS correction data to the agricultural implement using the IP address associated with the agricultural implement.

Example 2

The method of example 1, wherein the communications with the agricultural implement utilize a connectionless low overhead transport protocol.

Example 3

The method of example 2, wherein the connectionless low overhead transport protocol is a User Datagram Protocol (UDP).

Example 4

The method of any one of examples 1-3, wherein the request from the agricultural implement includes a device identifier, and wherein retrieving authentication information for the agricultural implement in the data store comprises retrieving the authentication information using the device identifier.

Example 5

The method of any one of examples 1-4, wherein responsive to receiving the streaming data from the GNSS correction streaming source, only forwarding the streaming data to the agricultural implement if a last periodic message from the agricultural implement was received within a threshold time period.

Example 6

A method of receiving streaming data on an agricultural implement, the method comprising: using one or more computer processors to perform the operations of: sending a request for GNSS correction data to a server over a network; setting a timer; responsive to an expiry of the timer: sending an update message to the server, the update message containing an identifier of the client unique to the client with respect to the server; and resetting the timer; receiving GNSS correction data corresponding to the requested GNSS correction data from the server over the network; and refining a position of the agricultural implement calculated by a GNSS receiver using the correction data.

Example 7 the method of example 6, wherein the timer is set to a value which is less than timeout value for a network firewall that the agricultural implement is behind.

Example 8

The method of any one of examples 6-7, wherein the request for GNSS correction data contains no authentication information other than the identifier of the agricultural implement.

Example 9

The method of any one of examples 6-8, wherein the agricultural implement communicates with the server partially over a cellular network.

Example 10

The method of any one of examples 6-9, wherein the GNSS correction data is Real Time Kinematic correction data.

Example 11

A method of providing GNSS correction data, the method comprising: using one or more computer processors to perform the operations of: receiving a request from a client device for the GNSS correction data, the client device located behind a firewall; retrieving authentication information for the client device in a data store; authenticating with a Global Navigation Satellite System (GNSS) correction source using the authentication information; requesting from the GNSS correction source the GNSS correction data; receiving a periodic message from the client device; responsive to receiving the periodic message from the client device, updating an Internet protocol (IP) address associated with the client device; receiving the GNSS correction data from the GNSS correction source; and responsive to receiving the GNSS correction data, forwarding the GNSS correction data to the client using the IP address associated with the client device.

Example 12

The method of example 11, wherein the communications with the client utilize a connectionless low overhead transport protocol.

Example 13

The method of example 12, wherein the communications protocol is a User Datagram Protocol (UDP).

Example 14

The method of any one of examples 11-13, wherein the request from the client includes a device identifier, and wherein retrieving authentication information for the client device in the data store comprises retrieving the authentication information using the device identifier.

Example 15

The method of any one of examples 11-14, wherein responsive to receiving the streaming data from the GNSS correction streaming source, only forwarding the streaming data to the client if a last periodic message from the client was received within a threshold time period.

Example 16

A method of receiving streaming data on a client device, the method comprising: using one or more computer processors to perform the operations of: sending a request for GNSS correction data to a server over a network; setting a timer; responsive to an expiry of the timer: sending an update message to the server, the update message containing an identifier of the client unique to the client with respect to the server; and resetting the timer; receiving the GNSS correction data from the server over the network; and refining a position calculated by a GNSS receiver using the correction data.

Example 17

The method of example 16, wherein the timer is set to a value which is less than timeout value for a network firewall that the client is behind.

Example 18

The method of any one of examples 16-17, wherein the request for GNSS correction data contains no authentication information other than the identifier of the client.

Example 19

The method of any one of examples 16-18, wherein the client device communicates with the server partially over a cellular network.

Example 20

The method of any one of examples 16-19, wherein the GNSS correction data is Real Time Kinematic correction data.

Example 21

A system for providing GNSS correction data, the system comprising: an input and output module configured to: receive a request from a client device for the GNSS correction data, the client device located behind a firewall; retrieve authentication information for the client device in a data store; authenticate with a Global Navigation Satellite System (GNSS) correction source using the authentication information; request from the GNSS correction source the GNSS correction data; receive a periodic message from the client device; a periodic message processor module configured to: receive the periodic message from the client device and in response, update an Internet protocol (IP) address associated with the client device; a stream processor module configured to: receive the GNSS correction data from the GNSS correction source; and in response, cause the input and output module to forward the GNSS correction data to the client using the IP address associated with the client device.

Example 22

The system of example 21, wherein the input and output module is configured to communicate with the client using a connectionless low overhead transport protocol.

Example 23

The system of example 22, wherein the communications protocol is a User Datagram Protocol (UDP).

Example 24

The system of any one of examples 21-23, wherein the request from the client includes a device identifier, and wherein the input and output module is configured to retrieve authentication information for the client device in the data store by at least retrieving the authentication information using the device identifier.

Example 25

The system of any one of examples 21-24, wherein the stream processor module is configured to only forward the streaming data to the client if a last periodic message from the client was received within a threshold time period.

Example 26

A system for receiving streaming data on a client device, the system comprising: an input and output module configured to: send a request for GNSS correction data to a server over a network; set a timer; responsive to an expiry of the timer: send an update message to the server, the update message containing an identifier of the client unique to the client with respect to the server; and reset the timer; receive the GNSS correction data from the server over the network; and a correction data processor module configured to: refine a position calculated by a GNSS receiver using the correction data.

Example 27

The method of example 26, wherein the timer is set to a value which is less than timeout value for a network firewall that the client is behind.

Example 28

The method of any one of examples 26-27, wherein the request for GNSS correction data contains no authentication information other than the identifier of the client.

Example 29

The method of any one of examples 26-28, wherein the client device communicates with the server partially over a cellular network.

Example 30

The method of any one of examples 26-29, wherein the GNSS correction data is Real Time Kinematic correction data.

Example 31

A machine readable medium that stores instructions which when performed by a machine, cause the machine to perform operations comprising: receiving a request from a client device for GNSS correction data, the client device located behind a firewall; retrieving authentication information for the client device in a data store; authenticating with a Global Navigation Satellite System (GNSS) correction; source using the authentication information; requesting from the GNSS correction source the GNSS correction data; receiving a periodic message from the client device; responsive to receiving the periodic message from the client device, updating an Internet protocol (IP) address associated with the client device; receiving the GNSS correction data from the GNSS correction source; and responsive to receiving the GNSS correction data, forwarding the GNSS correction data to the client using the IP address associated with the client device.

Example 32

The machine-readable medium of example 31, wherein the communications with the client utilize a connectionless low overhead transport protocol.

Example 33

The machine-readable medium of example 32, wherein the communications protocol is a User Datagram Protocol (UDP).

Example 34

The machine-readable medium of any one of examples 31-32, wherein the request from the client includes a device identifier, and wherein the instructions for retrieving authentication information for the client device in the data store comprises instructions for retrieving the authentication information using the device identifier.

Example 35

The machine-readable medium of any one of examples 31-34, wherein the instructions for forwarding the streaming data to the client include instructions to only forward the streaming data to the client if a last periodic message from the client was received within a threshold time period.

Example 36

A machine readable medium that stores instructions which when performed by a machine, cause the machine to perform operations comprising: sending a request for GNSS correction data to a server over a network; setting a timer; responsive to an expiry of the timer: sending an update message to the server, the update message containing an identifier of the client unique to the client with respect to the server; and resetting the timer; receiving the GNSS correction data from the server over the network; and refining a position calculated by a GNSS receiver using the correction data.

Example 37

The machine-readable medium of example 36, wherein the timer is set to a value which is less than timeout value for a network firewall that the client is behind.

Example 38

The machine-readable medium of any one of examples 36-37, wherein the request for GNSS correction data contains no authentication information other than the identifier of the client.

Example 39

The machine-readable medium of any one of examples 36-38, wherein the client device communicates with the server partially over a cellular network.

Example 40

The machine-readable medium of any one of examples 36-39, wherein the GNSS correction data is Real Time Kinematic correction data.

What is claimed is:

1. A method of sending GNSS correction data to an agricultural implement, the method comprising:
   using one or more computer processors to perform the operations of:
   receiving a request over a network from the agricultural implement for the GNSS correction data, the agricultural implement located behind a firewall;
   retrieving authentication information for the agricultural implement in a data store;
   authenticating with a Global Navigation Satellite System (GNSS) correction source using the authentication information;
   requesting from the GNSS correction source the GNSS correction data;
   receiving a unidirectional periodic message from the agricultural implement via a connectionless low overhead transmission medium at a correction assistance server without requiring a prompting of the agricultural implement by the correction assistance server;
   responsive to receiving the periodic message from the agricultural implement, updating an Internet protocol (IP) address associated with the agricultural implement;
   receiving the GNSS correction data from the GNSS correction source via a high overhead transmission medium, the high overhead transmission medium including a bi-directional overhead exchange for each receipt of GNSS correction data; and responsive to receiving the correction data, forwarding the GNSS correction data via the low overhead transmission medium to the agricultural implement using the IP address associated with the agricultural implement.

2. The method of claim 1, wherein the connectionless low overhead transmission medium does not require a bi-directional exchange.

3. The method of claim 1, wherein the request from the agricultural implement includes a device identifier, and wherein retrieving authentication information for the agricultural implement in the data store comprises retrieving the authentication information using the device identifier.

4. The method of claim 1, further including, responsive to receiving the GNSS correction data from the GNSS correction source, determining that a client connection between the agricultural implement and the correction assistance server has dropped and reestablishing the client connection, wherein forwarding the GNSS correction data to the agricultural implement occurs subsequent to reestablishing the client connection.

5. A method of receiving streaming data on an agricultural implement, the method comprising:
using one or more computer processors to perform the operations of:
sending a request for GNSS correction data to a correction assistance server over a network;
setting a timer;
responsive to an expiry of the timer:
sending a unidirectional update message to the server via a connectionless low overhead transmission medium, the update message containing an identifier of the agricultural implement unique to the agricultural implement with respect to the server without requiring a prompting of the agricultural implement by the correction assistance server; and
resetting the timer;
receiving GNSS correction data corresponding to the requested GNSS correction data from the server via the low overhead transmission medium; and
refining a position of the agricultural implement calculated by a GNSS receiver using the GNSS correction data.

6. The method of claim 5, wherein the timer is set to a value which is less than timeout value for a network firewall that the agricultural implement is behind.

7. The method of claim 5, wherein the request for GNSS correction data contains no authentication information other than the identifier of the agricultural implement.

8. The method of claim 5, wherein the connectionless low overhead transmission medium does not require a bi-directional exchange.

9. The method of claim 5, wherein the GNSS correction data is Real Time Kinematic correction data.

10. A method of providing GNSS correction data, the method comprising:
using one or more computer processors to perform the operations of:
receiving a request from a client device for the GNSS correction data, the client device located behind a firewall;
retrieving authentication information for the client device in a data store;
authenticating with a Global Navigation Satellite System (GNSS) correction source using the authentication information;
requesting from the GNSS correction source the GNSS correction data;
receiving a unidirectional periodic message from the client device via a connectionless low overhead transmission medium at a correction assistance server without requiring a prompting of the agricultural implement by the correction assistance server;
responsive to receiving the periodic message from the client device, updating an Internet protocol (IP) address associated with the client device;
receiving the GNSS correction data from the GNSS correction source via a high overhead transmission medium, the high overhead transmission medium including a bi-directional overhead exchange for each receipt of GNSS correction data; and
responsive to receiving the GNSS correction data, forwarding the GNSS correction data via the low overhead transmission medium to the client using the IP address associated with the client device.

11. The method of claim 10, wherein the connectionless low overhead transmission medium does not require a bi-directional exchange.

12. The method of claim 10, wherein the request from the client includes a device identifier, and wherein retrieving authentication information for the client device in the data store comprises retrieving the authentication information using the device identifier.

13. The method of claim 10, further including, responsive to receiving the GNSS correction data from the GNSS correction source, determining that a client connection between the agricultural implement and the correction assistance server has dropped and reestablishing the client connection, wherein forwarding the GNSS correction data to the agricultural implement occurs subsequent to reestablishing the client connection.

14. A method of receiving streaming data on a client device, the method comprising:
using one or more computer processors to perform the operations of:
sending a request for GNSS correction data to a correction assistance server over a network;
setting a timer;
responsive to an expiry of the timer:
sending a unidirectional update message to the server via a connectionless low overhead transmission medium, the update message containing an identifier of the client device unique to the client device with respect to the server without requiring a prompting of the agricultural implement by the correction assistance server; and
resetting the timer;
receiving the GNSS correction data from the server via the low overhead transmission medium; and
refining a position calculated by a GNSS receiver using the GNSS correction data.

15. The method of claim 14, wherein the timer is set to a value which is less than timeout value for a network firewall that the client is behind.

16. The method of claim 14, wherein the request for GNSS correction data contains no authentication information other than the identifier of the client.

17. The method of claim 14, wherein the connectionless low overhead transmission medium does not require a bi-directional exchange.

18. The method of claim 14, wherein the GNSS correction data is Real Time Kinematic correction data.

* * * * *